United States Patent
Nakayama et al.

(10) Patent No.: US 11,223,253 B2
(45) Date of Patent: Jan. 11, 2022

(54) STATOR FOR ROTATING ELECTRICAL MACHINE, ROTATING ELECTRICAL MACHINE, AND METHOD OF PRODUCING STATOR FOR ROTATING ELECTRICAL MACHINE

(71) Applicant: Hitachi Automotive Systems, Ltd., Hitachinaka (JP)

(72) Inventors: Kenichi Nakayama, Hitachinaka (JP); Naoki Nishikawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 494 days.

(21) Appl. No.: 16/033,867

(22) Filed: Jul. 12, 2018

(65) Prior Publication Data
US 2020/0021158 A1    Jan. 16, 2020

(51) Int. Cl.
| | |
|---|---|
| *H02K 3/34* | (2006.01) |
| *H02K 1/16* | (2006.01) |
| *H02K 1/27* | (2006.01) |
| *H02K 3/12* | (2006.01) |
| *H02K 7/00* | (2006.01) |
| *H02K 9/19* | (2006.01) |
| *H02K 15/085* | (2006.01) |
| *H02K 15/10* | (2006.01) |

(Continued)

(52) U.S. Cl.
CPC .............. *H02K 3/345* (2013.01); *H02K 1/16* (2013.01); *H02K 1/276* (2013.01); *H02K 3/12* (2013.01); *H02K 7/006* (2013.01); *H02K 9/19* (2013.01); *H02K 15/024* (2013.01); *H02K 15/085* (2013.01); *H02K 15/105* (2013.01); *B60K 6/26* (2013.01); *B60Y 2200/91* (2013.01); *B60Y 2200/92* (2013.01); *B60Y 2400/60* (2013.01)

(58) Field of Classification Search
CPC .. H02K 3/12; H02K 3/14; H02K 3/34; H02K 3/345; H02K 15/10
See application file for complete search history.

(56) References Cited

U.S. PATENT DOCUMENTS

| | | | | |
|---|---|---|---|---|
| 6,400,056 B1 * | 6/2002 | Naka | ....................... | H02K 3/345 |
| | | | | 310/215 |
| 2004/0256943 A1 * | 12/2004 | Omura | ................... | H02K 3/345 |
| | | | | 310/215 |

(Continued)

FOREIGN PATENT DOCUMENTS

| | | | | | |
|---|---|---|---|---|---|
| JP | | 58170334 A | * | 1/1983 | ............. H02K 3/345 |
| JP | | 58-170335 A | | 10/1983 | |

(Continued)

OTHER PUBLICATIONS

Machine translation of JP 58170334 A, retrieved from J PLAT PAT.*

(Continued)

*Primary Examiner* — Quyen P Leung
*Assistant Examiner* — Minki Chang
(74) *Attorney, Agent, or Firm* — Crowell & Moring LLP

(57) ABSTRACT

A stator for a rotating electrical machine includes a stator coil, a stator iron core having slots into which the stator coil is mounted, and insulating slot liners inserted into the slots, wherein conductive wire materials constituting the stator coil are inserted into the slot liners, and sections of the slot liners protruding from the slots are each provided with a bellows portion.

12 Claims, 17 Drawing Sheets

(51) Int. Cl.
*H02K 15/02* (2006.01)
*B60K 6/26* (2007.10)

(56) References Cited

U.S. PATENT DOCUMENTS

| | | | |
|---|---|---|---|
| 2011/0181143 A1* | 7/2011 | Hasegawa | H02K 3/38 |
| | | | 310/180 |
| 2018/0019625 A1 | 1/2018 | Nakayama | |
| 2019/0006903 A1 | 1/2019 | Kuroyanagi et al. | |

FOREIGN PATENT DOCUMENTS

| | | |
|---|---|---|
| JP | 2005-12887 A | 1/2005 |
| JP | 2005-110460 A | 4/2005 |
| JP | 2010-154693 A | 7/2010 |
| JP | 2011-151975 A | 8/2011 |
| JP | 2016-174441 A | 9/2016 |
| WO | WO 2017/110987 A1 | 6/2017 |
| WO | WO 2018/011637 A1 | 1/2018 |

OTHER PUBLICATIONS

International Search Report (PCT/ISA/210) issued in PCT Application No. PCT/JP2019/027796 dated Oct. 8, 2019 (two (2) pages).

* cited by examiner

FIG. 7
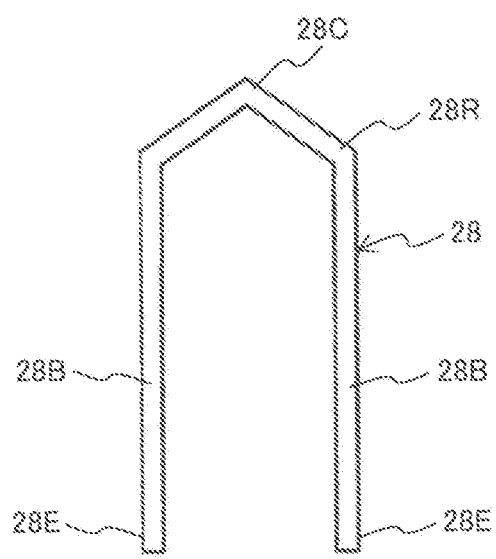
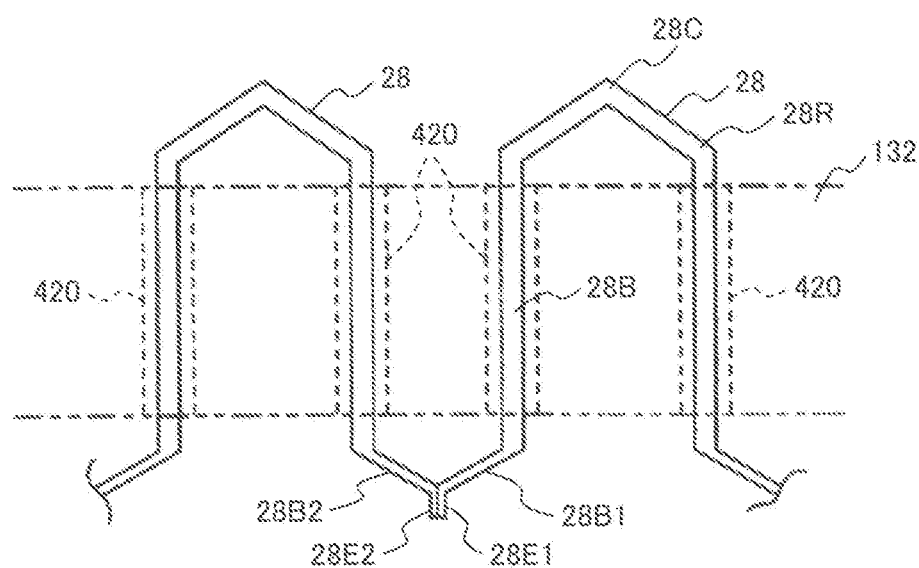

STATOR FOR ROTATING ELECTRICAL MACHINE, ROTATING ELECTRICAL MACHINE, AND METHOD OF PRODUCING STATOR FOR ROTATING ELECTRICAL MACHINE

TECHNICAL FIELD

The present invention relates to a stator for a rotating electrical machine, a rotating electrical machine using the stator and a method of producing the stator of the rotating electrical machine.

BACKGROUND ART

With the rotating electrical machine, the rotor rotates by rotating magnetic field generated with an alternating current power supplied to a stator coil. Further, with the rotating electrical machine, kinetic energy applied to the rotor is converted into electric energy, thereby alternating current power being outputted from the stator coil. In this way, the rotating electrical machine acts as an electric motor or a generator.

Regarding the stator of such rotating electrical machine, such a technique is known as segment coil terminals being welded for connection (e.g. refer to the disclosure of Japanese Patent Unexamined Application Publication No. 2011-151975). Further, such a technique is known as reducing the stator coil section in size while securing the creepage distance of the stator coil section by a folded portion being provided on the insulating paper of the stator (e.g. refer to the disclosure of Japanese Patent Unexamined Application Publication No. 2005-110460).

In order to mount such rotating electrical machine to such a narrow and limited space as found in automobiles, it is required that it is reduced in size. On the other hand, in order to secure a gap between the upper portions of the coil ends at the stator and such attachment sections as a transmission section, it is preferred that the coil ends height is lowered at welded and/or unwelded portions at the segment sections. However, with the stator of the rotating electrical machine according to the prior art, it is difficult that the coil ends height is reduced.

SUMMARY OF THE INVENTION

It is an object of the present invention to provide a stator for a rotating electrical machine, a rotating electrical machine and a method of producing a stator for a rotating electrical machine, which all allow the coil ends height to be reduced.

The stator of the rotating electrical machine according to the present invention includes a stator coil, a stator iron core provided with slots into which the stator coil is mounted, and insulating slot liners inserted into the slots, the conductive wire materials constituting the stator coil being inserted into the slot liners, and the sections of the slot liners protruding from the slots being each provided with a bellows portion.

The rotating electrical machine according to the present invention includes a stator and a rotor opposed to the stator, the stator being the stator for the rotating electrical machine according to the present invention as mentioned above.

The method of producing a stator for the rotating electrical machine according to the present invention includes the steps of inserting the insulating slot liners into the slots of the stator iron core, inserting the conductive wire materials constituting the stator coil and each provided with a bended section into the slot liners inserted into the slots, and pressing the sections of the slot liners protruding from the slots with the bended sections of the conductive wire materials so as to form a bellows portion on each of the protruding sections.

According to the present invention, it allows the coil ends height to be reduced without deteriorating the insulation property of the stator.

Other objects, features and advantages of the invention will appear from the following description with the accompanying drawings.

BRIEF DESCRIPTION OF THE DRAWINGS

FIG. 7 shows views to explain the segment conductors constituting the stator coil 60;

DESCRIPTION OF THE PREFERRED EMBODIMENTS

Figure 1:
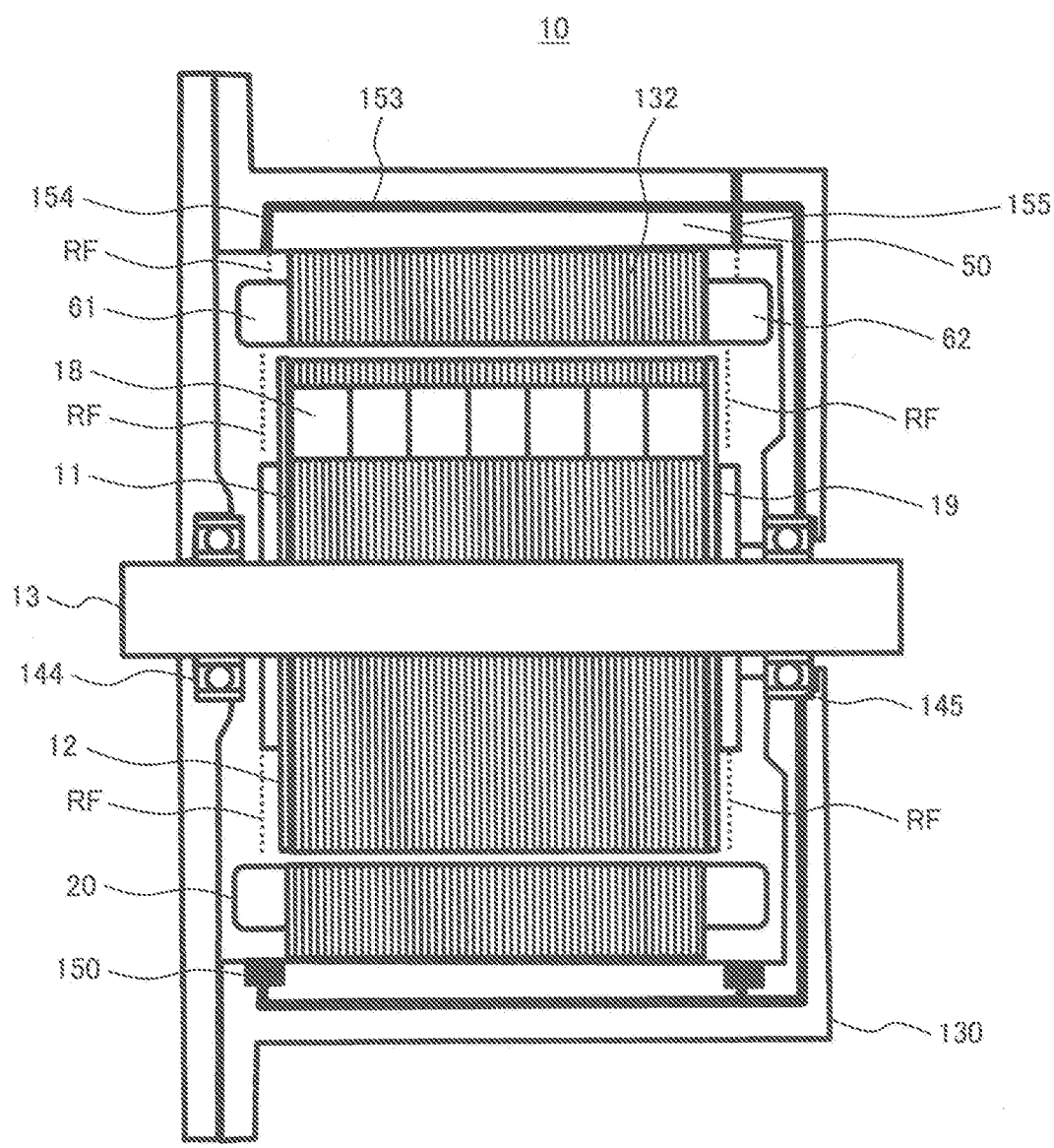
FIG. 1 is a cross-sectional view of a rotating electrical machine according to one embodiment of the present invention.

An embodiment of the present invention is described below with reference to the accompanying drawings.

In each drawing, what has the same reference numeral denotes the same characteristic feature or a characteristic feature having a similar function. To note, the characteristic features with reference numerals which are not explained in one drawing are explained in another drawing where appropriate.

To begin with, an automobile in which a rotating electrical machine according to one embodiment of the present invention is mounted is explained.

Figure 22:
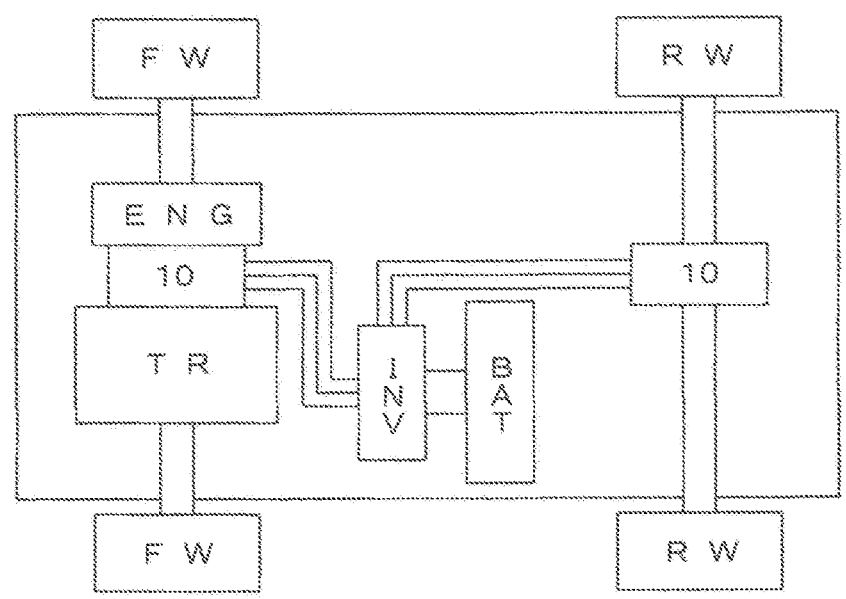
FIG. 22 illustrates a schematic structure of a hybrid electric vehicle according to one embodiment of the present invention.

FIG. 22 shows a schematic structure of a hybrid electric vehicle (HEV) in which the rotating electrical machine according to one embodiment of the present invention is mounted. To note, the rotating electrical machine according to one embodiment of the present invention is also applicable to an electric vehicle (EV) which has no engine and runs only with a rotating electrical machine besides HEV.

In the following explanation, 'axial direction' denotes a direction along the rotational axis of the rotating electrical machine. 'Circumferential direction' denotes a direction along the revolving direction of the rotating electrical machine. 'Radial direction' denotes a direction of (radius vector) from the rotational axis of the rotating electrical machine as a center. 'Inner circumferential side' denotes a radially inner side (inner radial side) while 'outer circumferential side' denoting a side opposed to the circumferential inner side or a radially outer side (outer radial side).

The HEV illustrated in FIG. 22 has an engine ENG and a rotating electrical machine 10 as the main driving sources of its front wheels. The power generated by the engine ENG and the rotating electrical machine 10 is transmitted through a transmission TR to the front wheels FW. Further, as with the driving force of the rear wheels, it is the rotating electrical machine 10 that acts as the main driving source of the rear wheels side. By the rotating electrical machine 10 disposed at the rear wheels side being mechanically connected to the rear wheels RN, the power of the rotating electrical machine 10 is transmitted to the rear wheels RN. The rotating electrical machine 10 which is the driving source of the front wheels side is disposed within a narrow space between the engine ENG and the transmission TR.

The rotating electrical machine 10 starts the engine ENG. Further, the rotating electrical machine 10 generates driving power (torque) according to the running condition of a vehicle while generating an electric power to recover kinetic energy as electric energy when the vehicle decelerates. The driving operation and electric power generation operation of the rotating electrical machine 10 are controlled by an inverter INV such that the torque and engine speed are optimized according to the driving condition of the vehicle. The driving power of the rotating electrical machine 10 is supplied through the inverter INV from a battery BAT. Further, the electric power generated by the rotating electrical machine 10 is stored in the battery BAT through the inverter INV.

The rotating electrical machine 10 is an interior permanent magnet synchronous motor. The rotating electrical machine 10 acts as an electric motor in which a rotor is rotated by a three-phase alternating current being supplied to a stator coil. Further, the rotating electrical machine 10 being driven by the engine ENG, it acts as a generator so as to output a three-phase alternating electric power. In other words, the rotating electrical machine 10 has both the function as an electric motor to generate rotational torque by electric energy and that as a generator to output electric power by kinetic energy. Then, according to the running condition of the vehicle, either of such functions is selectively used.

Now, the rotating electrical machine according to one embodiment of the present invention is explained as follows. FIG. 1 is a cross-sectional view of the rotating electrical machine according to one embodiment of the present invention.

As illustrated in FIG. 1, the rotating electrical machine 10 is disposed within a liquid-cooled jacket 130. The liquid-cooled jacket 130 is constituted by the case of the engine ENG or that of the transmission TR. The rotating electrical machine 10 includes a stator 20, a housing 50 to retain the stator 20 therein and a rotor 11.

With the stator 20, a stator coil is wound around a stator iron core 132. The coil end sections (an unwelded side coil end 61 and a welded side coil end 62 as described below) protrude from the stator iron core 132 in a rotational axis direction. With the rotor 11, a permanent magnet 18 is embedded in a rotor iron core 12. A shaft 13 corresponding to a rotational axis is fixed at the center of the rotor iron core 12. Further, an end ring 19 acting as a retaining plate for the permanent magnet 18 is provided on an axially end surface of the rotor iron core 12. To note, with the rotor iron core 12, several thin electromagnetic steel sheets (silicon steel sheets) are laminated one over another.

The liquid-cooled jacket 130 is fixed on the outer circumference side of the housing 50. Refrigerant passages 153, 154 and 155 for such liquid refrigerants RF as oil are provided through a gap between the inner circumferential wall of the liquid-cooled jacket 130 and the outer circumferential wall of the housing 50.

To note, in the case of the direct liquid-cooled method according to the present embodiment, the stator 20 is cooled by the refrigerant RF filled in a refrigerant storage space 150 passing through the refrigerant passage 153 and outflowing towards the coil ends 61 and 62 of the stator 20 further via the refrigerant passage 154 and the refrigerant passage 155. Herein, for examples, oil for cooling purpose is adopted for the refrigerant RF.

The shaft 13 to which the rotor iron core 12 is fixed is rotatably supported through bearings 144 and 145 provided on the liquid-cooled jacket 130 and is positioned within the stator 20 with a prescribed space from the stator 20 and rotates at a position opposed to the stator 20. In other words, the liquid-cooled jacket 130 also functions as a bearings bracket.

The stator 20 is fixed on the inner circumferential side of the housing 50. The rotor 11 is rotatably supported on the inner circumferential side of the stator 20. The housing 50 is molded into a cylindrical shape by cutting of such iron based materials as carbon steel, steel casting, die-casting of an aluminum alloy or pressing work on such materials and provides an outer shell of the rotating electrical machine 10. The housing 50 also functions as a framework or a frame.

The housing 50 is produced by a steel plate (such as a high-tension steel plate) whose thickness is in the order of 2 to 5 mm being molded into a cylindrical shape by drawing. A plurality of flanges (not shown in the drawings) which are attached to the liquid-cooled jacket 130 are provided on the housing 50. The plurality of flanges protrude outwards with respect to a radial direction from the circumferential fringe of one end face of the cylindrical housing 50. To note, those flanges are formed by portions other than those corresponding to the flanges of the end sections of the housing 50 which are formed upon the housing being subjected to drawing being removed, so that they are structurally integral with the housing 50. To note, the stator 20 may be directly fixed to the liquid-cooled jacket 130 for encasing the stator without the provision of the housing 50.

Figure 2:
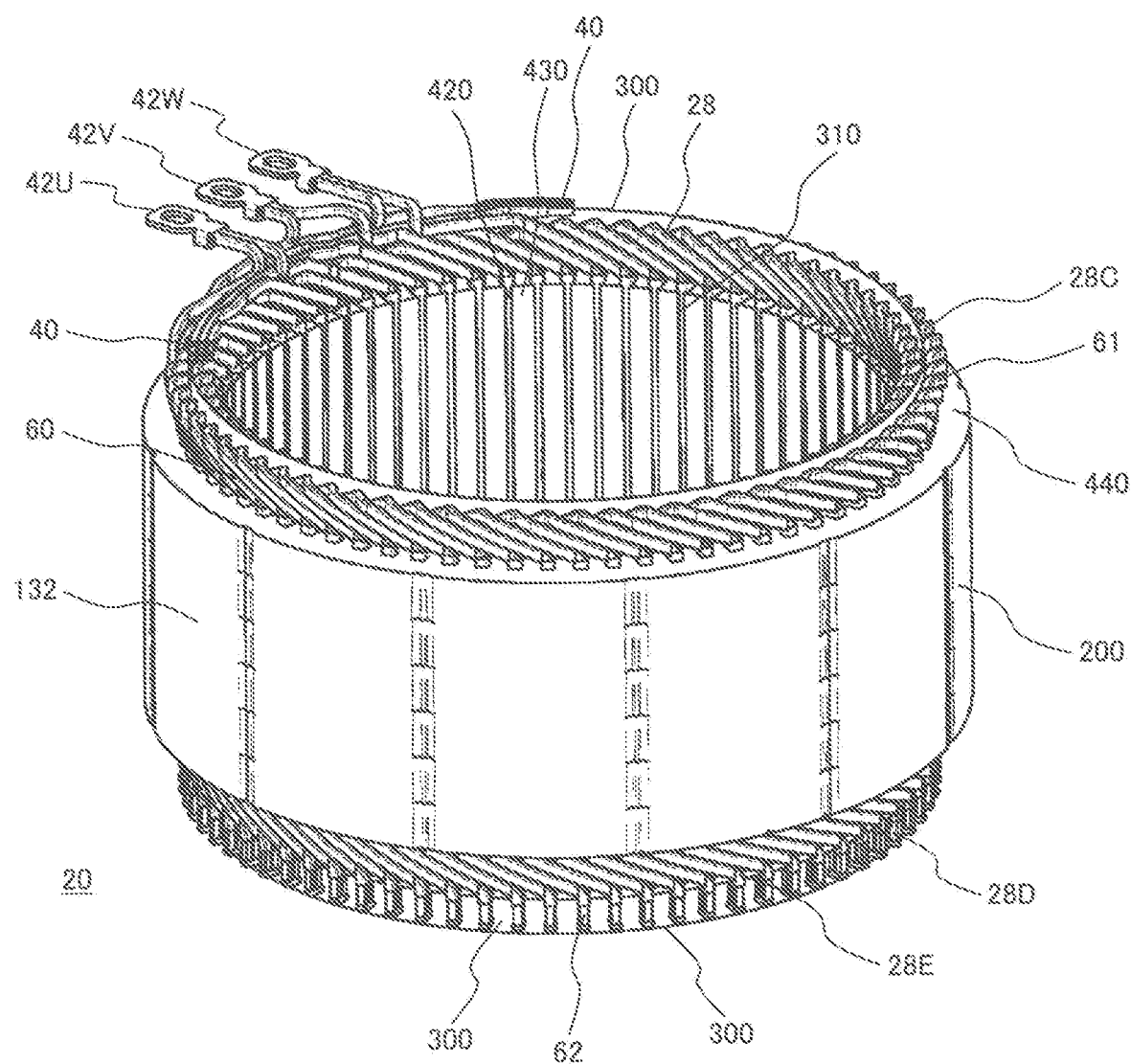
FIG. 2 is a whole perspective view of a stator 20.

FIG. 2 is a whole perspective view of the stator 20.

As illustrated in FIG. 2, the stator 20 includes a stator iron core 132 and a stator coil 60. With the stator iron core 132, a plurality of thin electromagnetic steel sheets (silicon steel sheets) are laminated one over another. The stator coil 60 is wound around a number of slots provided on the inner circumferential section of the stator iron core 132. The heat emitted from the stator coil 60 is transmitted to the liquid-cooled jacket 130 (see FIG. 1) through the stator iron core 132 and is discharged by the refrigerant RF (see FIG. 1) flowing through the liquid-cooled jacket 130.

Figure 3:
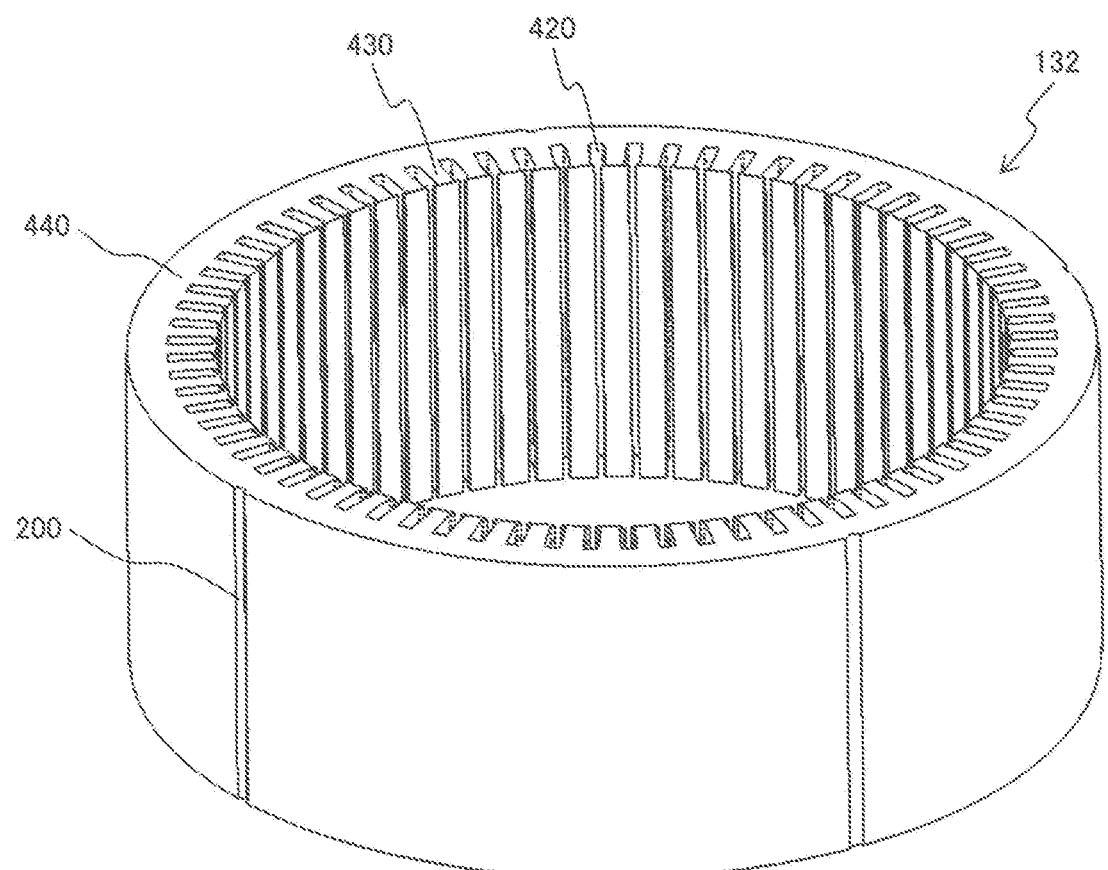
FIG. 3 is a whole perspective view of a stator iron core 132.

FIG. 3 is a whole perspective view of the stator iron core 132.

As illustrated in FIG. 3, a plurality of slots 420 in parallel with the axial direction of the stator iron core 132 are provided at equal interval among them around the circumferential direction of the stator iron core 132. The number of the slots 420 is 72 according to the present embodiment by way of one example and the stator coil 60 (see FIG. 2) is received in the slots 420. Each of the slots 420 opens at the inner circumferential side of the stator iron core 132. The circumferential width of the opening of each slot 420 is substantially the same as that of the coil mounting section of each slot 420 to which the stator coil 60 is mounted or slightly smaller than that of the coil mounting section.

The stator iron core 132 has teeth 430 among the slots 420. Each of the teeth 430 is structurally integral with an annular core back 440. In other words, the stator iron core 132 is an integral core in which each tooth 430 and the core back 440 are integrally molded. The teeth 430 guide rotating magnetic field generated by the stator coil 60 to the rotor 11, thereby, rotational torque being generated for the rotor 11.

The stator iron core 132 is provided by molding electromagnetic steel sheets whose thickness is in the order of 0.05 to 1.0 mm by blanking and laminating a plurality of molded annular electromagnetic steel sheets one over another. Welded sections 200 are provided on the outer circumferential section of the cylindrical stator iron core 132 in parallel with the axial direction of the stator iron core 132 through e.g. TIG (Tungsten Inert Gas) welding and laser welding. To note, instead of such welded sections 200, e.g. swaging may be applied.

Figure 4:
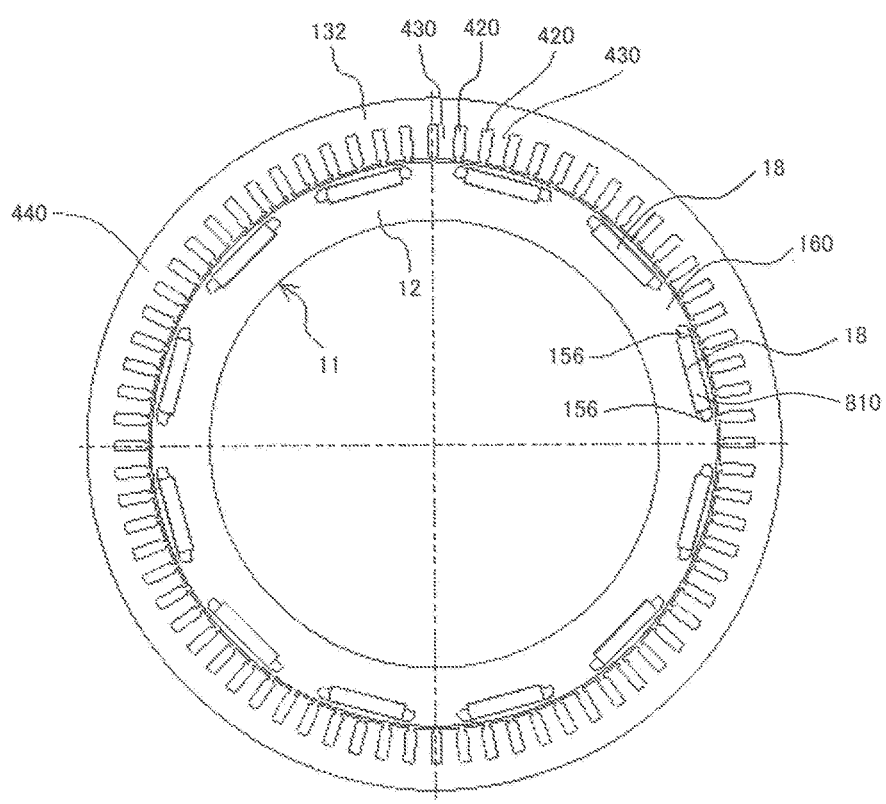
FIG. 4 shows cross-sectional views of a rotor and the stator iron core of the rotating electrical machine illustrated in FIG. 1.

FIG. 4 illustrates the cross sections of the rotor 11 and the stator iron core 132 of the rotating electrical machine 10 illustrated in FIG. 1. These cross sections are those seen from a direction perpendicular to the axial direction. To note, in the illustration of FIG. 4, the shaft 13 (see FIG. 1) is omitted.

As illustrated in FIG. 4, magnet insertion holes 810 into each of which a rectangular permanent magnet 18 is inserted are disposed at equal interval in the circumferential direction of the rotor iron core 12. The permanent magnet 18 is fixed in each of the magnet insertion holes 810 by means of e.g. an adhesive, a powdered resin and mold. The width of the magnet insertion hole 810 in the circumferential direction is made larger than that of the permanent magnet 18 in the same direction. Thus, a space 156 for magnetic flux barrier is made between each end of the permanent magnet 18 in the width direction thereof and the rotor iron core 12. An adhesive may be embedded into such space 156. Alternatively, by filling a molding resin within the space 156, such resin may be embedded within the space 156 in the meantime the permanent magnet 18 may be fixed within each of the magnet insertion holes 810.

The permanent magnets 18 form the field poles of the rotor 11. According to the present embodiment, it is arranged such that one permanent magnet 18 forms one magnetic pole, but it may be arranged such that a plurality of permanent magnets 18 form each magnetic pole. By increasing the number of permanent magnets 18, it permits the density of the magnetic flux of each magnetic pole generated by the permanent magnets to be made higher so as to be able to make magnetic torque enhanced.

The magnetization direction of each permanent magnet 18 is oriented to the radial direction and such magnetization direction is reversed each and every field pole. In other words, providing that the stator side magnetic pole face of the permanent magnet 18 for forming a certain magnetic pole is magnetized into an N pole while the rotational axis side magnetic pole face thereof is magnetized into an S pole, the stator side magnetic pole face of the permanent magnet 18 for forming the adjoining magnetic pole is magnetized into an S pole while the rotational axis side magnetic pole face thereof is magnetized into an N pole. Those permanent magnets 18 are disposed in the circumferential direction such that their magnetization directions alternately change each and every magnetic pole. According to the present embodiment, the number of the permanent magnets 18 is 12, which are at equal interval disposed in the circumferential direction while the rotor 11 has 12 magnetic poles.

Here, neodymium and samarium based sintered magnets, ferrite magnets and neodymium based bonded magnets are adoptable for the permanent magnet 18, by way of some examples. According to the present embodiment, the rotor 11 has an auxiliary magnetic pole 160 between the permanent magnets 18. This auxiliary magnetic pole 160 acts such that it reduces the magnetic reluctance for the q-axis magnetic flux generated by the stator coil 60. Because the magnetic reluctance for the q-axis magnetic flux is largely reduced compared with the magnetic reluctance of the d-axis magnetic flux due to the presence of such auxiliary magnetic pole 160, it can advantageously enhance reluctance torque.

Then, the arrangement of the stator coil is explained with reference to FIGS. 5 to 7.

Figure 5:
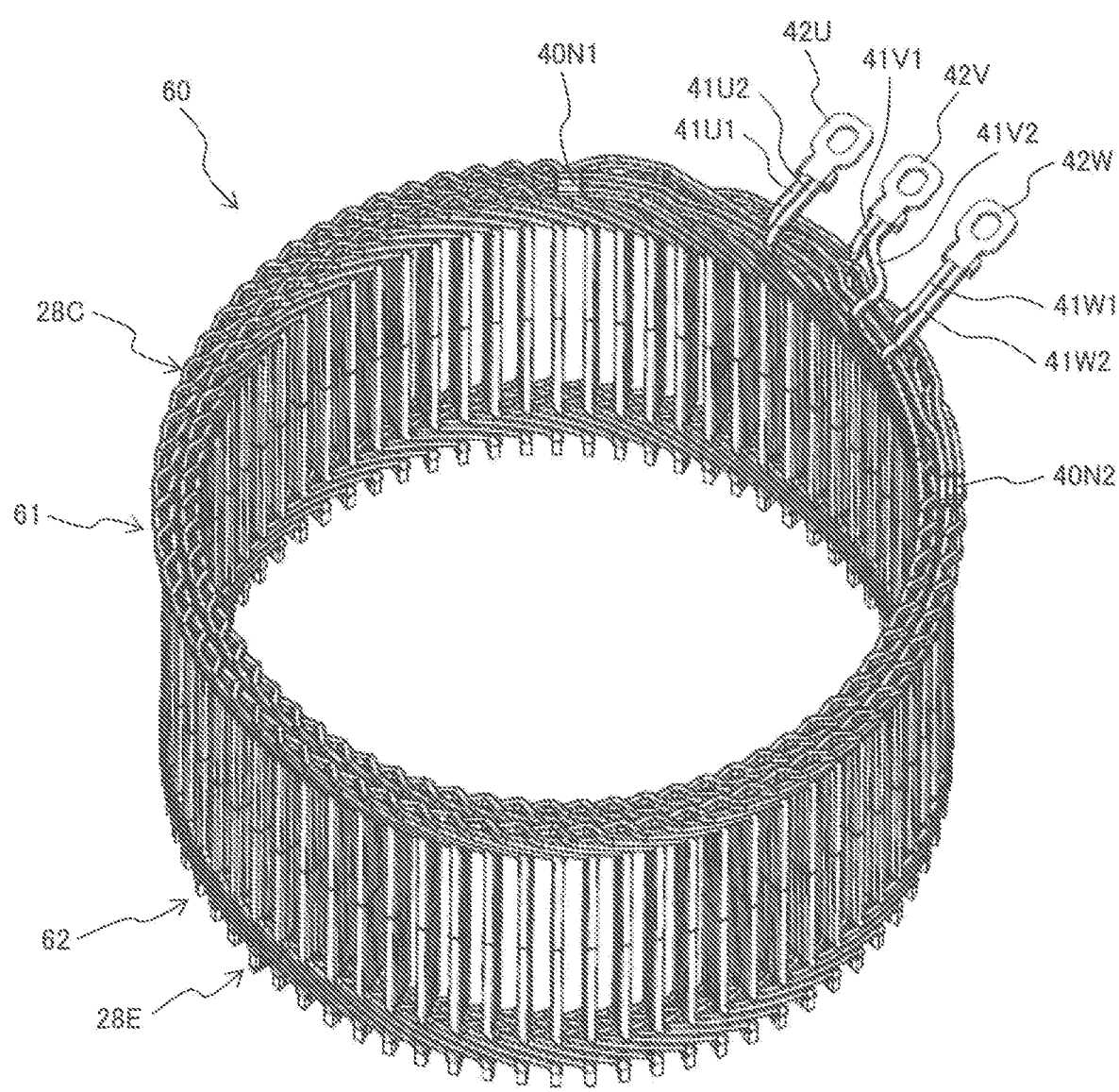
FIG. 5 is a whole perspective view of a stator coil 60.

FIG. 5 is a whole perspective view of the stator coil 60. FIG. 6 is a conceptual view showing the connection state of the stator coil 60. FIG. 7 is a view to explain segment conductors 28 constituting the stator coil 60.

As illustrated in FIG. 5, the stator coil 60 is assembled from the segment conductors 28 illustrated in FIG. 7. The stator coil 60 is a three-phase coil (i.e. U-phase coil 60U, V-phase coil 60V and N-phase coil 60W) arranged such that the plurality of segment conductors 28 are interconnected with one another and illustrated in FIG. 6.

Figure 6:
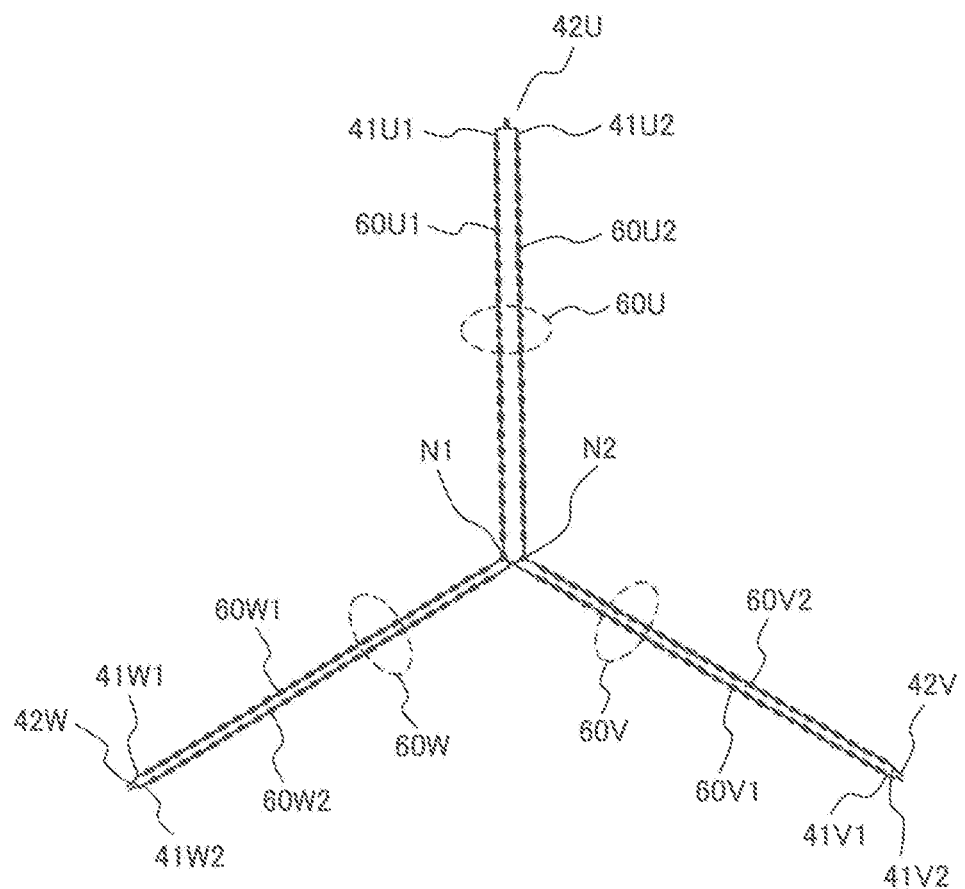
FIG. 6 is a conceptual view showing the connection state of the stator coil 60.

The stator coil 60 according to the present embodiment is arranged with two star connections in which such two star connections are connected in parallel as illustrated in FIG. 6. In other words, the stator coil 60 is provided with the first star connection including a U1-phase coil 60U1, a V1-phase coil 60V1 and a W1-phase coil 60W1 and the second star connection including a U2-phase coil 60U2, a V2-phase coil 60V2 and a W2-phase coil 60W2. The neutral point N1 of the first star connection is separated from the neutral point N2 of the second star connection.

Flat wires rectangular in cross section are adopted for the conductive wire materials constituting the stator coil 60 according to the present embodiment. Within each of the slots 420, the long side of the rectangular cross section of the flat wire extends along the circumferential direction of the stator iron core 132 while the short side thereof extends along the radial direction of the stator iron core 132. The outer circumferential surface of the flat wire is covered with insulating coat. An oxygen-free copper or an oxygen-containing copper is adopted for the material of the conductor or the flat wire. In the case of the oxygen-containing copper, the content of oxygen is in the order of substantially 10 ppm to 1000 ppm.

To note, the cross-sectional shape of the conductive wire materials constituting the stator coil 60 is not limited to the rectangular one, but may be square or round. It should be noted that in the case where the cross-sectional shape of the conductive wire materials is rectangular or square, the space factor by which the stator coil occupies the slots 420 (see FIG. 3) increases so as to be able to enhance of the efficiency of the rotating electrical machine. It should be further noted that in the case where the cross-sectional shape of such conductive wire materials is rectangular, the sides of such conductive wire materials along the radial direction of the stator iron core 132 may be longer or shorter than the sides of such conductive wire materials along the circumferential direction thereof.

In FIG. 7, the segment conductors 28 before being mounted to the stator iron core 132 are illustrated (in the upper view) and those 28 after being mounted thereto are illustrated (in the lower view). The segment conductor 28 before being mounted to the stator iron core 132 includes a bended flat wire and has a substantially U shape with a pair of leg sections 28B in parallel with each other and an apex section 28C interconnecting the leg sections 28B with each other.

As illustrated FIG. 7 (in the lower view), a plurality of segment conductors 28 are connected to each phase coil. According to the present embodiment, one and the other of the pair of leg sections 28B of the segment conductor 28 are inserted into one and the other of two slots 420 different from each other from one side of the stator iron core 132 with respect to the axial direction of the stator iron core. Further, the leg sections 28 of the adjoining two segment conductors 28 protruding to the other side of the stator iron core 132 with respect to the axial direction of the stator iron core 132 are bended towards the segment conductor 28 to be connected and the end portions 28E1 and 28E2 of the two leg sections 28B1 and 28B2 facing each other of the adjoining two segment conductors 28 are welded to each other.

The apex sections 28C protruding to one side of the stator iron core 132 forms a coil end 61 on one side of the stator coil 60 illustrated in FIG. 5. Further, the end portions 28E protruding to the other side of the stator iron core 132 forms a coil end 62 on the other side of the stator coil 60 illustrated in FIG. 5. To note, hereinafter, the coil end 61 is referred to as 'unwelded side coil end 61' while the coil end 62 is referred to as 'welded side coil end 62'.

As illustrated in FIGS. 5 and 6, a lead wire 41U1 to be connected to the one end of the U1-phase coil 60U1 and a lead wire 41U2 to be connected to the one end of the U2-phase coil 60U2 are drawn out to the side of the unwelded side coil end 61. Both the lead wires 41U1 and 41U2 are connected to an alternating current terminal 42U. Further, a lead wire 41V1 to be connected to the one end of the V1-phase coil 60V1 and a lead wire 41V2 to be connected to the one end of the V2-phase coil 60V2 are drawn out to the side of the unwelded side coil end 61. Both the lead wires 41V1 and 41V2 are connected to an alternating current terminal 42V. Moreover, a lead wire 41W1 to be connected to the one end of the W1-phase coil 60W1 and a lead wire 41W2 to be connected to the one end of the W2-phase coil 60W2 are drawn out to the side of the unwelded side coil end 61. Both the lead wires 41W1 and 41W2 are connected to an alternating current terminal 42W.

Furthermore, a conductor 40N1 for the neutral point connection and a conductor 40N2 for the neutral point connection are placed to the side of the unwelded side coil end 61. The conductor 40N1 for the neutral point connection is connected to the neutral point N1 (see FIG. 6) of the first star connection while the conductor 40N2 for the neutral point connection is connected to the neutral point N2 of the second star connection.

As illustrated in FIG. 5, the stator coil 60 according to the present embodiment is wound around the stator iron core 132 by distributed winding. The distributed winding is defined as phase windings being wound around the stator iron core 132 such that phase windings are received in two slots 420 spaced apart from each other with passing over a plurality of slots 420 (see FIG. 3). The magnetic flux distribution (spatial distribution) by the stator coil adopting such distributed winding approximates a sine wave compared with the stator coil adopting concentrated winding so as to facilitate reluctance torque to be generated. Thus, the rotating electrical machine according to the present embodiment is applicable to a wide range of rotational speeds from low to high because controllability on weak field control and control required for making use of reluctance torque improves. Accordingly, the rotating electrical machine 10 according to the present embodiment realizes motor characteristics optimal for e.g. an electric vehicle.

Figure 8:
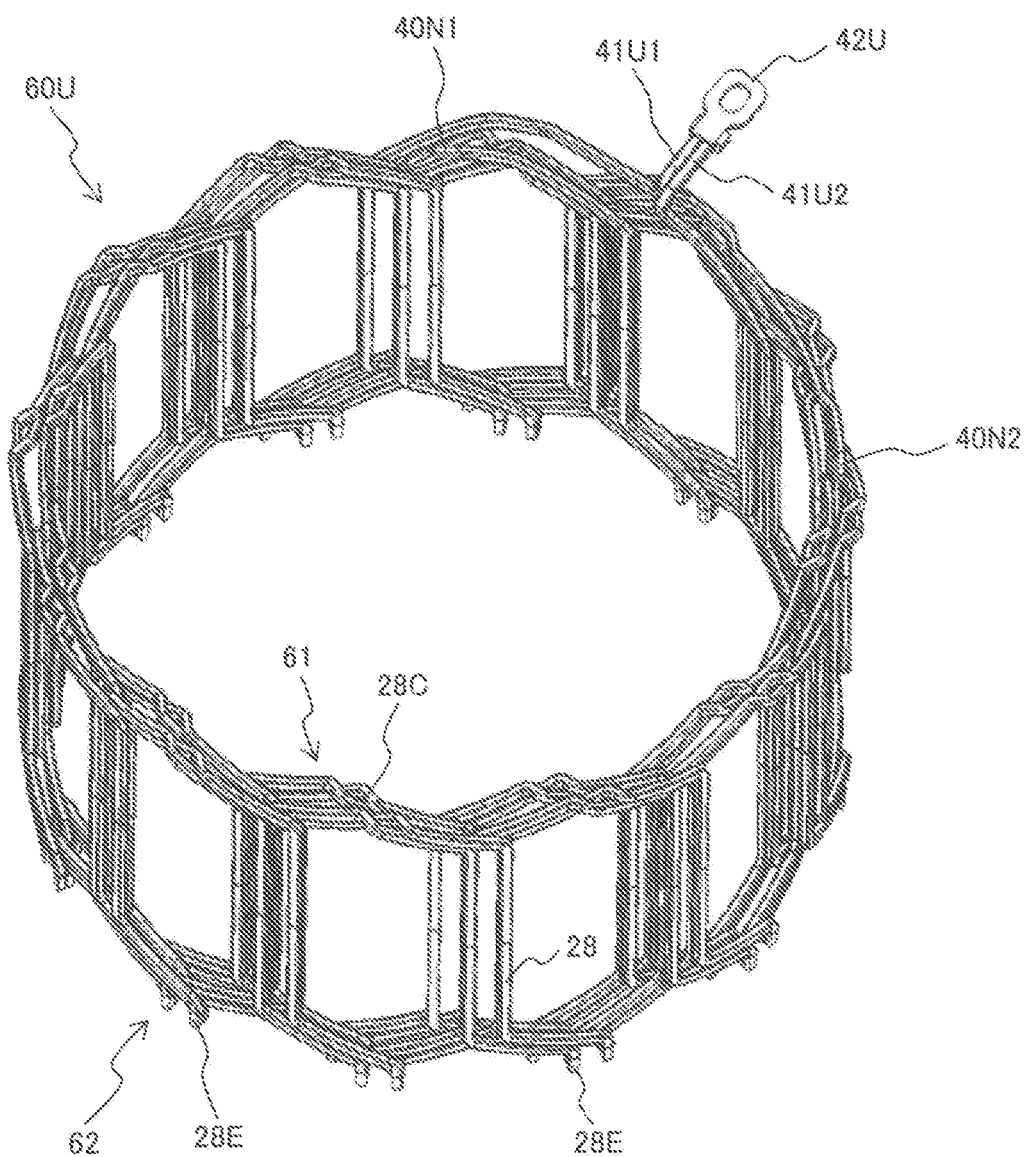
FIG. 8 is a perspective view showing a U-phase coil 60U of the stator coil 60 illustrated in FIG. 5.

FIG. 8 is a perspective view showing the U-phase coil 60U which is one phase part of the stator coil 60 illustrated in FIG. 5.

As illustrated in FIG. 8, the U-phase coil 60U includes two phase coils, namely, a U1-phase coil 60U1 and U2-phase coil 60U2 (see FIG. 6) and is provided with an alternating current terminal 42U to which the one end of the U1-phase coil 60U1 and that of the U2-phase 60U2 are connected in common.

The V-phase coil 60V and the Vu-phase coil 60W are different in the position where they are wound around the stator iron core from the U-phase coil 60U, such position being not illustrated in the drawings, but they have the same arrangement as the U-phase coil 60U illustrated in FIG. 8.

Figure 9:
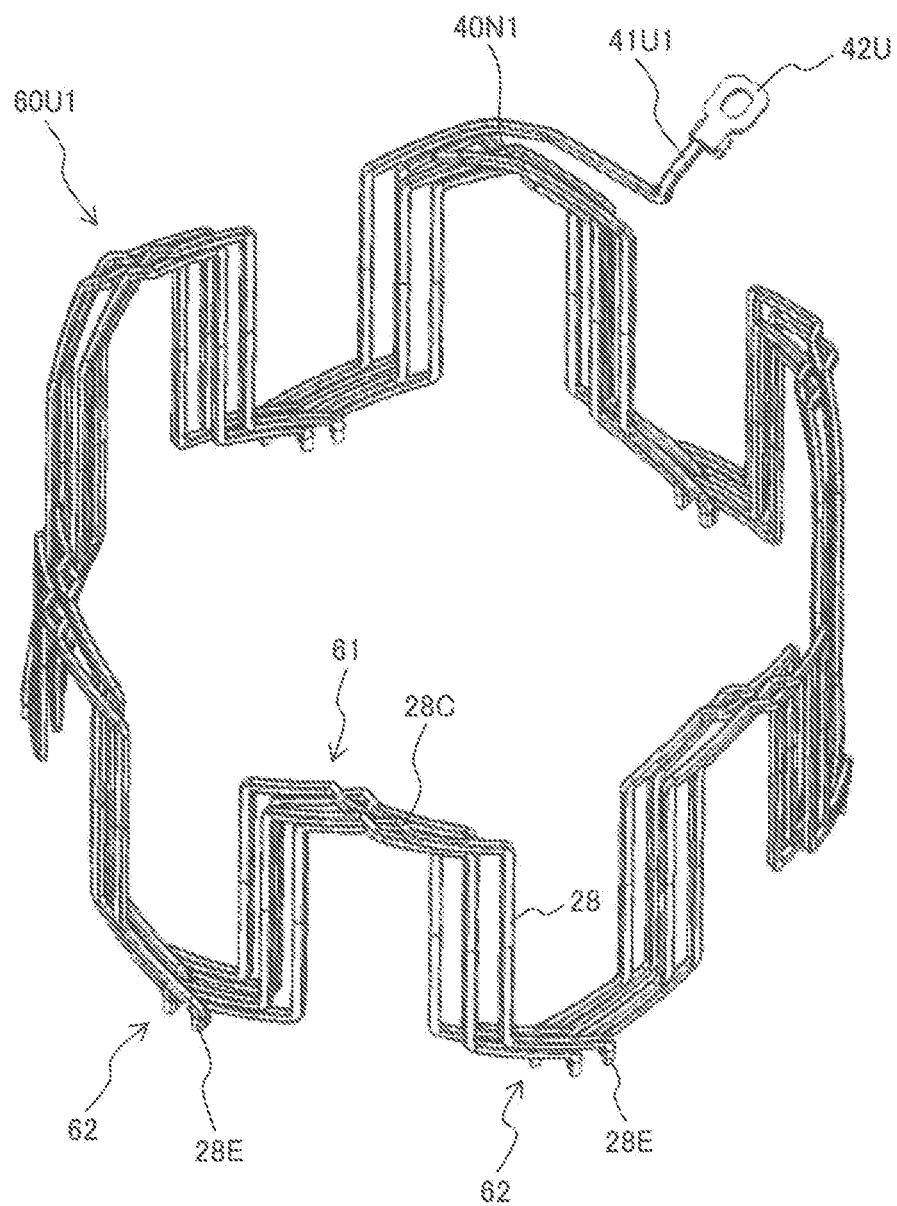
FIG. 9 is a perspective view showing a U1-phase coil 60U1.

FIG. 9 is a perspective view showing the U1-phase coil 60U1 which is one of the U1-phase coil 60U1 and the U2-phase coil 60U2 (see FIG. 6) constituting the U-phase coil 60U.

As illustrated in FIG. 9, the U1-phase coil 60U1 is wound around the stator iron core by distributed winding. The lead wire 41U1 and the conductor 40N1 for the neutral point connection are connected to the one end of the U1-phase coil 60U1 and the other end thereof respectively. The lead wire 41U1 is connected to the alternating current terminal 42U. The conductor 40N1 for the neutral point connection is electrically connected to each conductor for the neutral point connection of the V1-phase coil 60V1 and the W1-phase coil 60W1 (not illustrated in the drawing concerned, so see FIG. 6) so as to form the neutral point of the first star connection.

To note, the V1-phase coil 60V1 and the W1-phase coil 60W1 are different in the position where they are wound around the stator iron core from the U1-phase coil 60U1, but they have the same arrangement as the U1-phase 60U1 illustrated in FIG. 9

Figure 10:
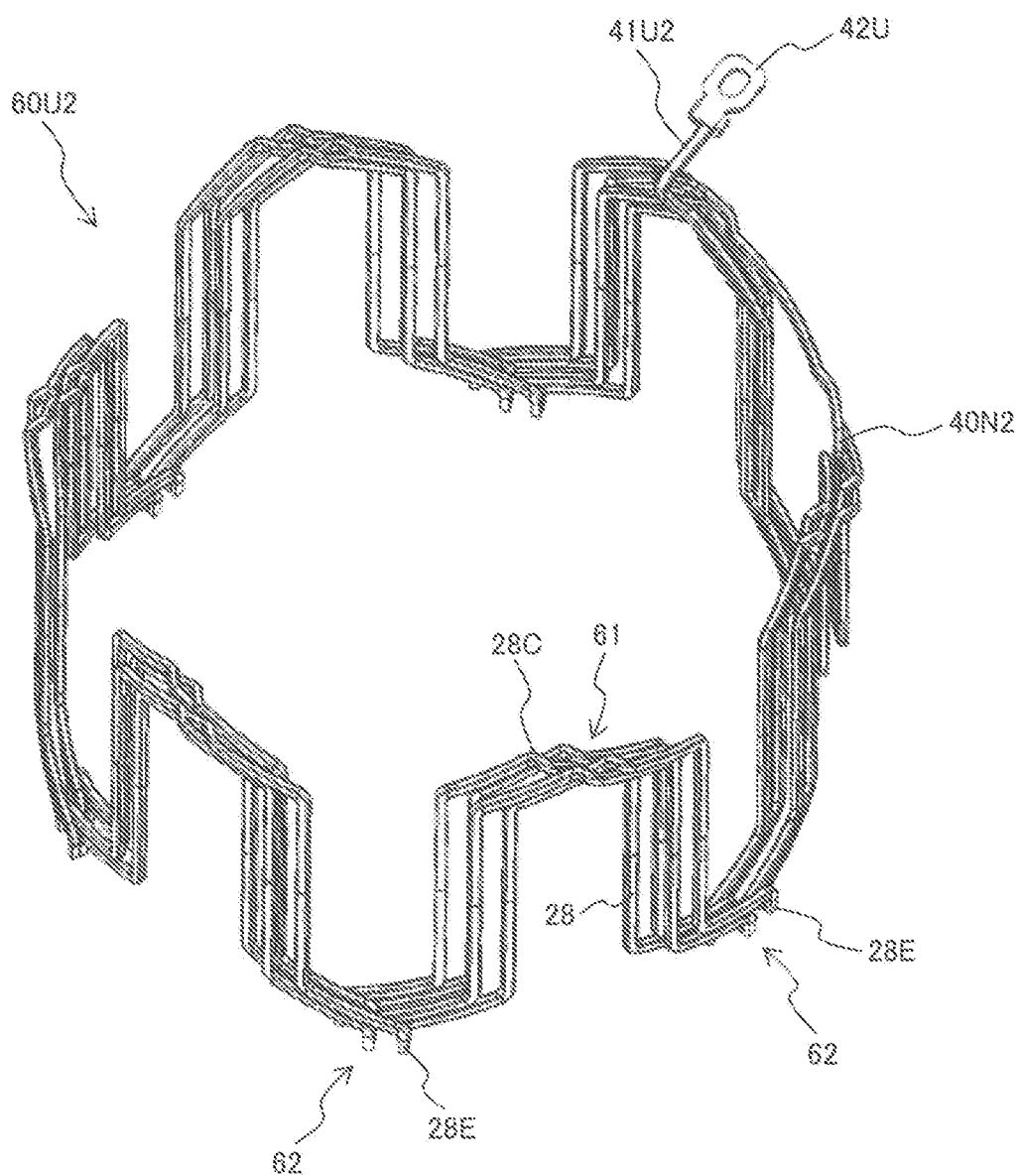
FIG. 10 is a perspective view showing a U2-phase coil 60U2.

FIG. 10 is a perspective view showing the U2-phase coil 60U2 which is one of the U1-phase coil 60U1 and the U2-phase coil 60U2 (see FIG. 6) constituting the U-phase coil 60U.

As illustrated in FIG. 10, the U2-phase coil 60U2 is wound around the stator iron core by distributed winding. The lead wire 41U2 and the conductor 40N2 for the neutral point connection are connected to the one end of the U2-phase coil 60U2 and the other end thereof respectively. The lead wire 41U2 is connected to the alternating current terminal 42U. The conductor 40N2 for the neutral connection is electrically connected to each conductor for the neutral point connection of the V2-phase coil 60V2 and the W2-phase coil 60W2 (not illustrated in the drawing concerned, so see FIG. 6) so as to form the neutral point of the second star connection. To note, the V2-phase coil 60V2 and the W2-phase coil 60W2 are different in the position where they are wound around the stator iron core from the U2-phase coil 60U2, but they have the same arrangement as the U2-phase coil 60U2 illustrated in FIG. 10.

Now, the method of producing the stator 20 according to the present embodiment is explained as follows.

As illustrated in FIG. 7, after the segment conductors 28 are inserted into the slots of the stator iron core 132, the leg sections 28B1 and 28B2 of the segment conductors 28 drawn out from the slots 420 are bended towards the counterpart segment conductor 28 to be connected. For instance, in FIG. 7, the leg sections 28B1 and 28B2 protruding from the slots 420 are bended to the left side and the right side respectively with respect to the circumferential direction. Then, the end portion 28E1 of the leg section 28B1 and the end portion 28E2 of the leg section 28B2 are disposed such that they are adjoining to each other in the radial direction.

Figure 11:
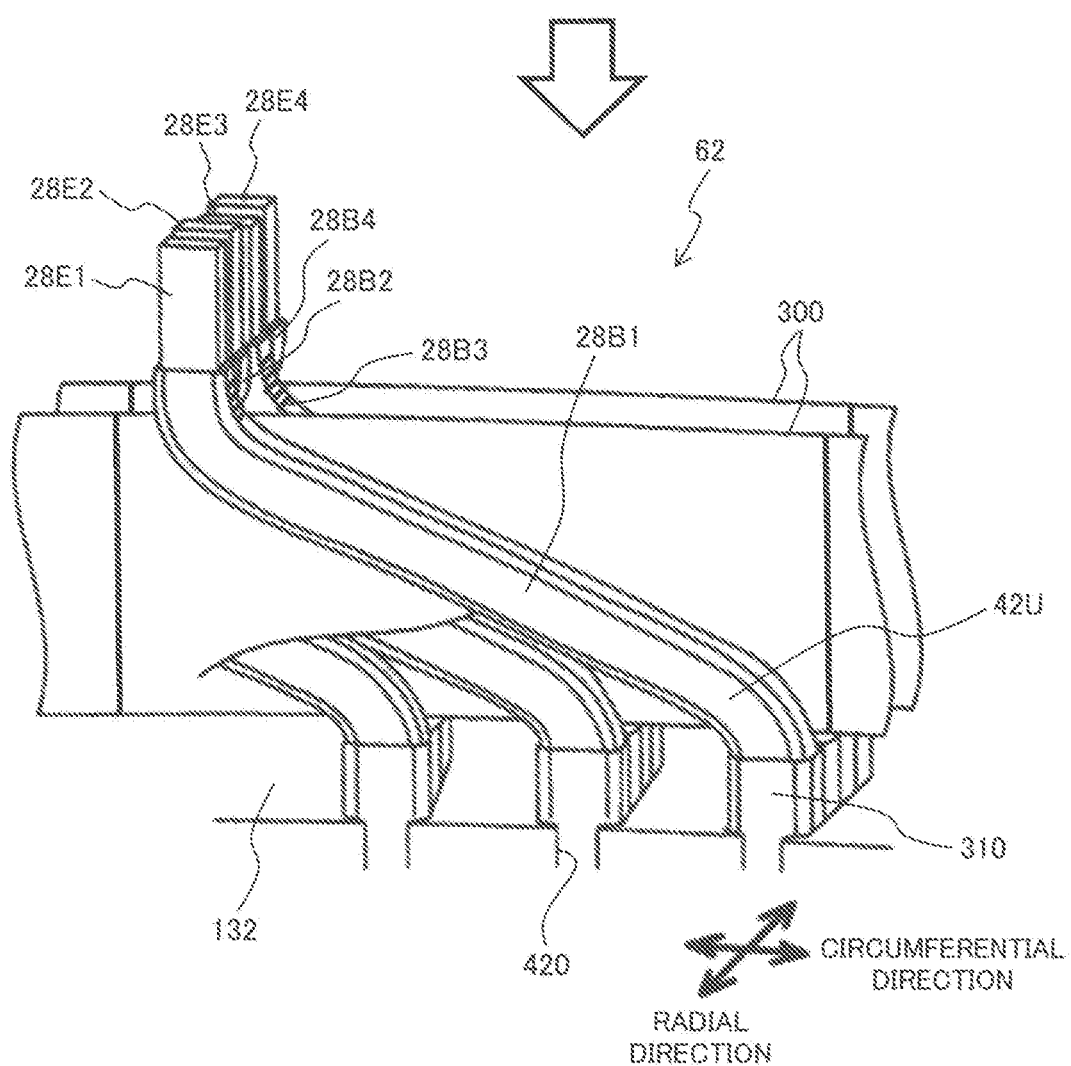
FIG. 11 shows the vicinities of the end portions 28E1 to 28E4 of the segment conductors 28.

FIG. 11 illustrates the vicinities of the plurality of end portions 28E1 to 28E4 of the segment conductors 28 after being bended as well as before being welded to one another at the welded side coil end 62.

As illustrated in FIG. 11, four rows of segment conductors 28 are inserted into the slot 420 in the radial direction. A slot liner 310 is provided on the leg sections 28B1 to 28B4 which are inserted into the slot 420. With the conductive wire materials of the segment conductors 28, portions of the leg sections 28B1 to 28B4 protruding from the slot 402 and adjoining to the opening of the slot 420 and portions of the leg sections located within the slot 420 are covered with the slot liner 310 made of a thin insulator such as insulating paper. In other words, the slot liner 310 is located within the slot 420 as well as a part of the slot liner 310 protrudes out of the opening of the slot 420. Accordingly, the linear portion of the segment conductor 28 illustrated in FIG. 7 excepting its bended section is covered with the slot liner 310. To note, an insulating coat is removed from the end portions 28E1 to 28E4 respectively for electrical connection with welding, so that the surfaces of the conductors are exposed.

With the provision of the slot liner 310, dielectric strength among the segment conductors 28 as well as between the segment conductors 28 and the inner surface of the slot 420 is enhanced. To note, insulating paper 300 for interlayer insulation is disposed between the adjoining segment conductors in the radial direction.

Cutting work is performed on the end portions 28E1 to 28E4 for aligning the height of the tips of the end portions 28E1 to 28E4 or to suppress the height of the coil end. Provided that the height of the coil end is in alignment, such cutting work may be omitted.

The end portions 28E1 and 28E2 are connected to each other by welding. Further, the end portions 28E3 and 28E4 are connected to each other by welding. Thus, a welded section in which a base material (conduction component of the wire material of the conductor) is melted and cured is formed on the end portions 28E1 and 28E2 respectively. Further, such welded section is formed on the end portions 28E3 and 28E4 as well. Such arc welding as TIG (Tungsten Inert Gas) welding, and plasma welding are adoptable for welding operation, by way of some examples. Argon, helium and a mixed gas between argon and helium are adoptable for the shield gas, by way of some examples.

Figure 12:
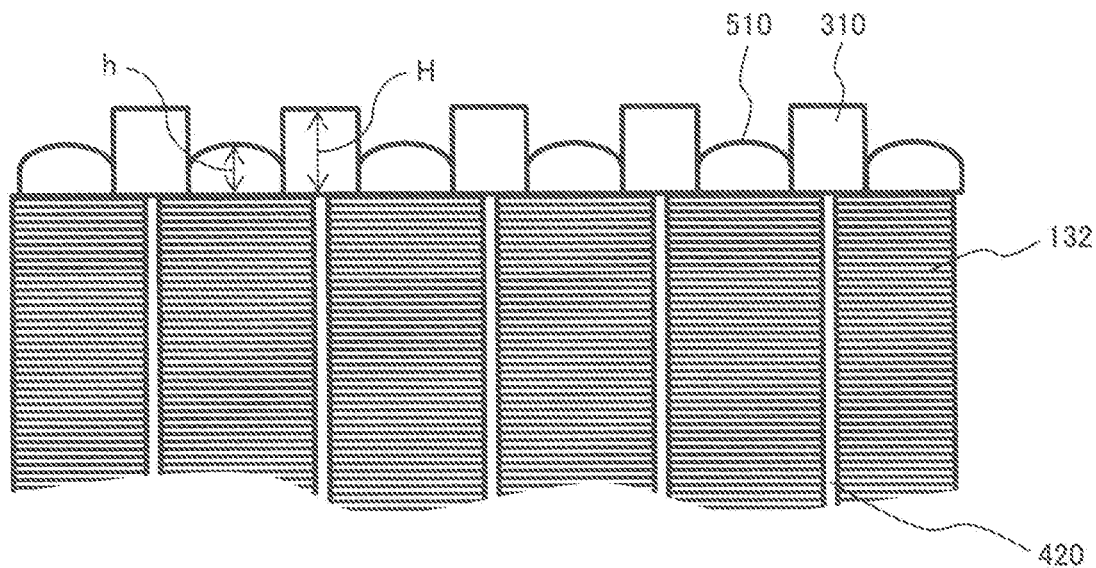
FIG. 12 illustrates the state of the stator iron core 132 after the slot liners are inserted into the slots.

FIG. 12 illustrates the state of the stator iron core 132 after the slot liners 310 are inserted into the slots 420 and before the segment conductors 28 are inserted into the slots 420. To note, the illustration of FIG. 12 corresponds to the state where the stator iron core 132 is seen from the forefront along the circumferential direction depicted in FIG. 11 (the same being applied to the illustrations of FIGS. 13 to 21).

As illustrated in FIG. 12, after the slot liners 310 are inserted into the slots 420, the coil stopper jigs 510 (tools) to retain the segment conductors at the prescribed position with respect to the axial direction are mounted between the sections of the adjoining slot liners 310 protruding from the slots 420. The coil stopper jigs 510 are bar-shaped and are inserted between the protruding sections of the slot liners 310 such that their longitudinal directions go along the circumferential direction (depicted in FIG. 11). The contact surfaces of the coil stopper jigs 510 with the stator iron core 132 are flat. The contact surfaces of the coil stopper jigs 510 with the slot liners 310 are chamfered, thereby, the slot liners 301 being prevented from damage.

According to the present embodiment, the exposed surfaces of the coil stopper jigs 510 opposed to their contact surfaces with the stator iron core 132 take arcuately curved surfaces which convexly run outwards with respect to the coil stopper jigs 510. The height (h) of the coil stopper jig 510 in the rotational axis direction (i.e. direction perpendicular to the circumferential direction and radial direction depicted in FIG. 11) is smaller than the height (H) of the protruding section of the slot liner 310.

To note, the coil stopper jigs 510 may be mounted with an automated machine.

Figure 13:
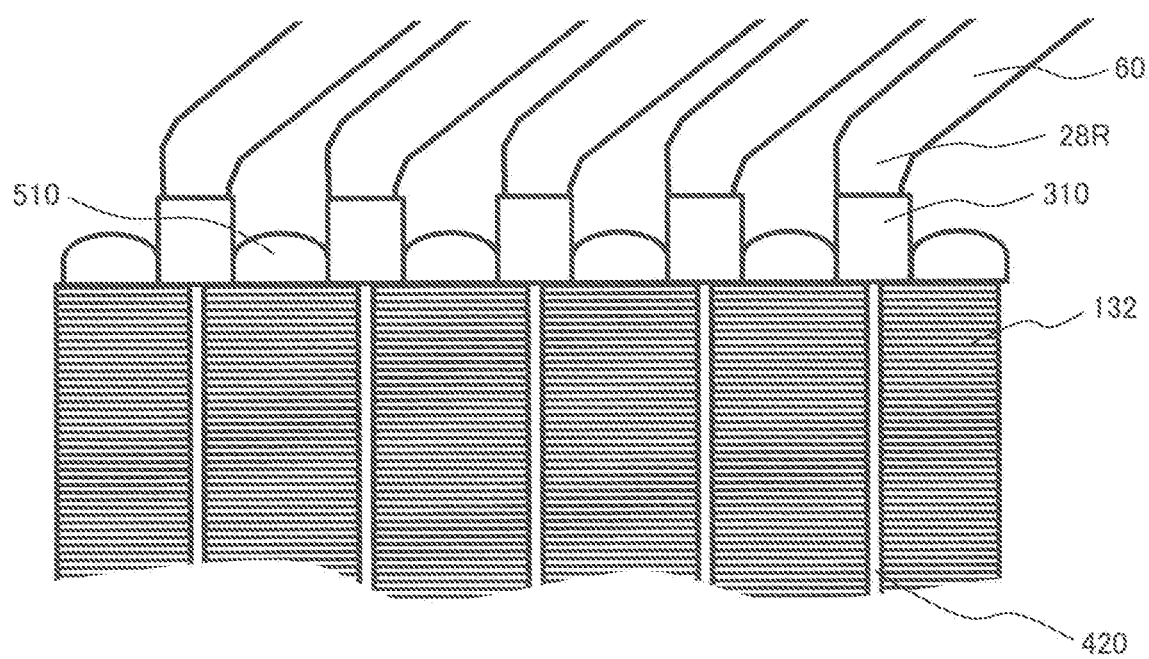
FIG. 13 illustrates the state of the stator iron core 132 immediately after the stator coil 60 is inserted into the slot liners 310.

FIG. 13 illustrates the state of the stator iron core 132 immediately after the stator coil 60 is inserted into the slot liners 310.

As illustrated in FIG. 13, each segment conductor is inserted into each slot 420 and into each slot liner 310.

In the state illustrated in FIG. 13, by the whole stator coil 60 being pressed from the upper side of the illustration or along the axial direction, the respective segment conductors are pushed into the slots 420 up to the prescribed position according to the height h of the coil stopper jigs 510. Thereby, the height of the coil end section along the axial direction can be reduced. In this regard, the process for pushing the stator coil 60 ends into the slots when the protruding sections of the segment conductors or their bended sections 28R abut onto the coil stopper jigs 510. Accordingly, the amount by which the stator coil 60 is pushed into the slots is controlled by the height of the coil stopper jigs 510. This prevents the segment conductors from being excessively pushed into the slots or prevents the segment conductors and the slot liners 310 from being damaged.

To note, the stator coil 60 may be pushed into the slots with an automated machined.

Figure 14:
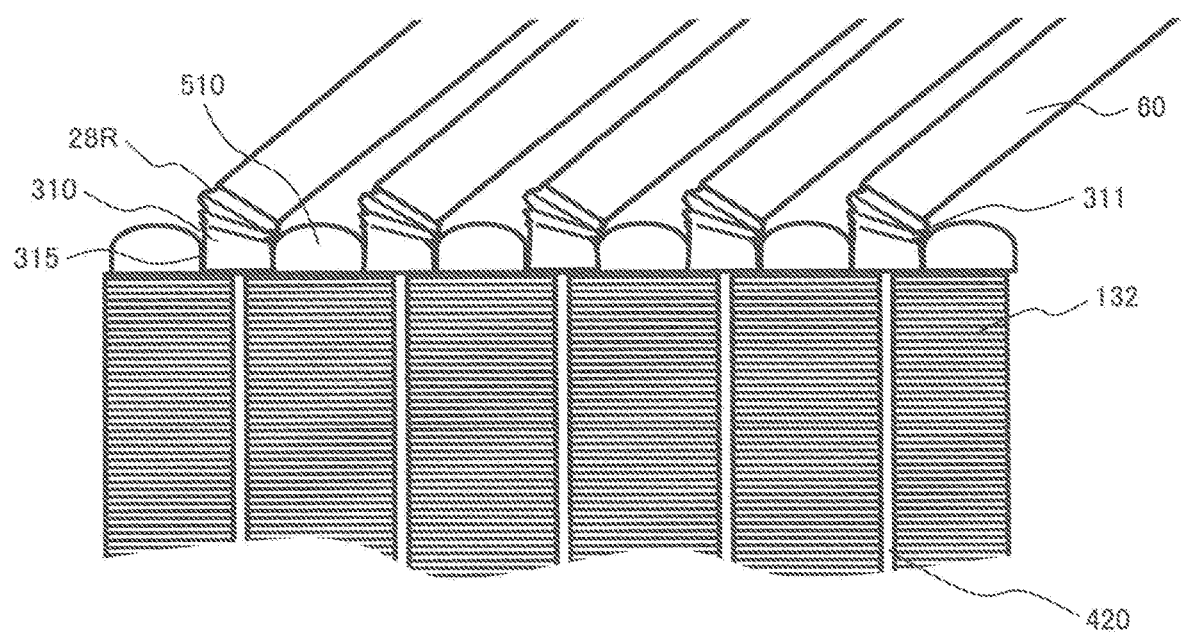
FIG. 14 illustrates the state of the stator iron core 132 after the stator coil 60 is pushed into the slots.

FIG. 14 illustrates the state of the stator iron core 132 after the stator coil 60 is pushed into the slots.

Upon the stator coil 60 being pushed into them, the bended sections 28R of the segment conductors abut onto the tip end portions of the protruding sections of the slot liners 310, in other words, the protruding portions of the slot liners 310 being compressed by such bended sections 28R. Thereby, as illustrated in FIG. 14, bellows portions 311 are formed on the protruding sections of the slot liners 310. Since the electrical insulation interval between the segment conductors and the stator iron core 132 is secured due to such bellows portions 311, the insulation property of the stator 20 improves.

To note, as mentioned above, the coil stopper jigs 510 prevent the stator coil 60 from being excessively pushed into the slots while the chamfered contact surfaces of the coil stopper jigs 510 with the slot liners 310 prevent the bellows portions 311 from being damaged.

To note, the state illustrated in FIG. 14 where the bended sections 28R abut onto the bellows-like tip end portions of the slot liners 310 is kept intact in the production process of the stator after such bellows portions 311 are formed as well as after the production process of the stator completes.

Figure 15:
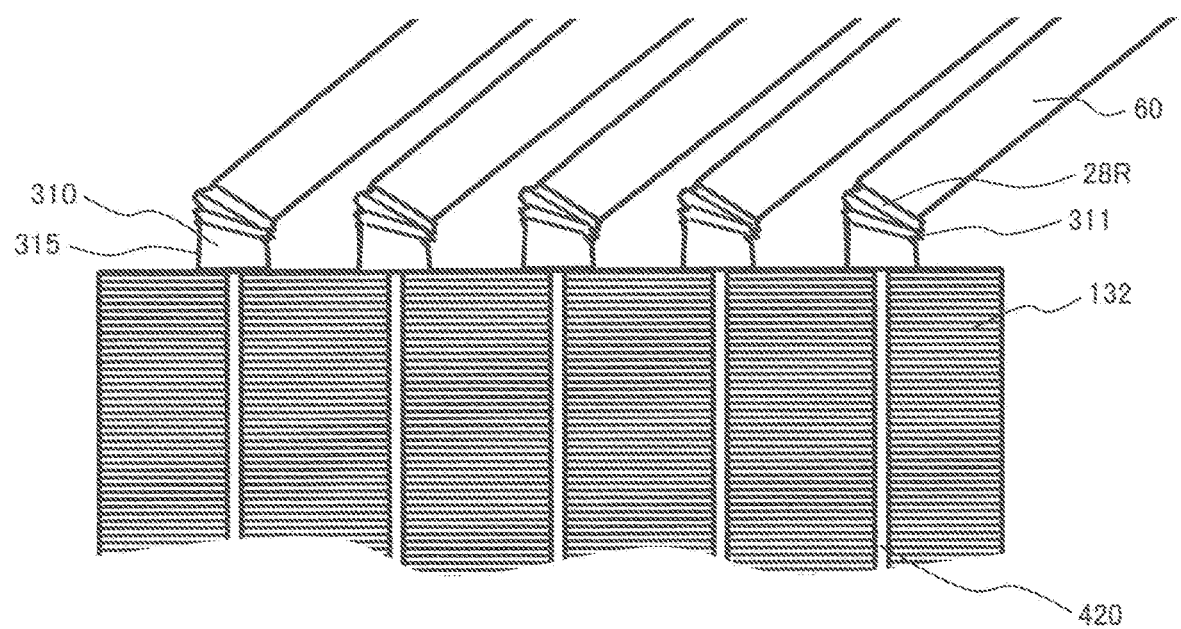
FIG. 15 illustrates the state of the stator iron core 132 when the coil stopper jigs are removed.

FIG. 15 illustrates the state of the stator iron core 132 after the stator coil 60 is pushed into the slots and when the coil stopper jigs are removed.

With the presence of the bellows portions 311, the protruding sections of the slot liners 310 are hard to be torn, so that the electrical insulation distance between the segment conductors and the stator iron core can be secured with higher reliability. Further, upon performing varnish treatment on the stator in such state as mentioned above, an insulating varnish permeates through the entries of the bellows portions 311 so that the insulation property of the stator improves.

To note, the bellows portions 311 may be provided on both ends of the slot liners 310 or on their protruding sections on both the welded side coil end section and the unwelded side coil end section. Thereby, the coil ends height can be reduced as well as the electrical insulation distance between the stator coil 60 and the stator iron core 132 can be secured.

Figure 16:
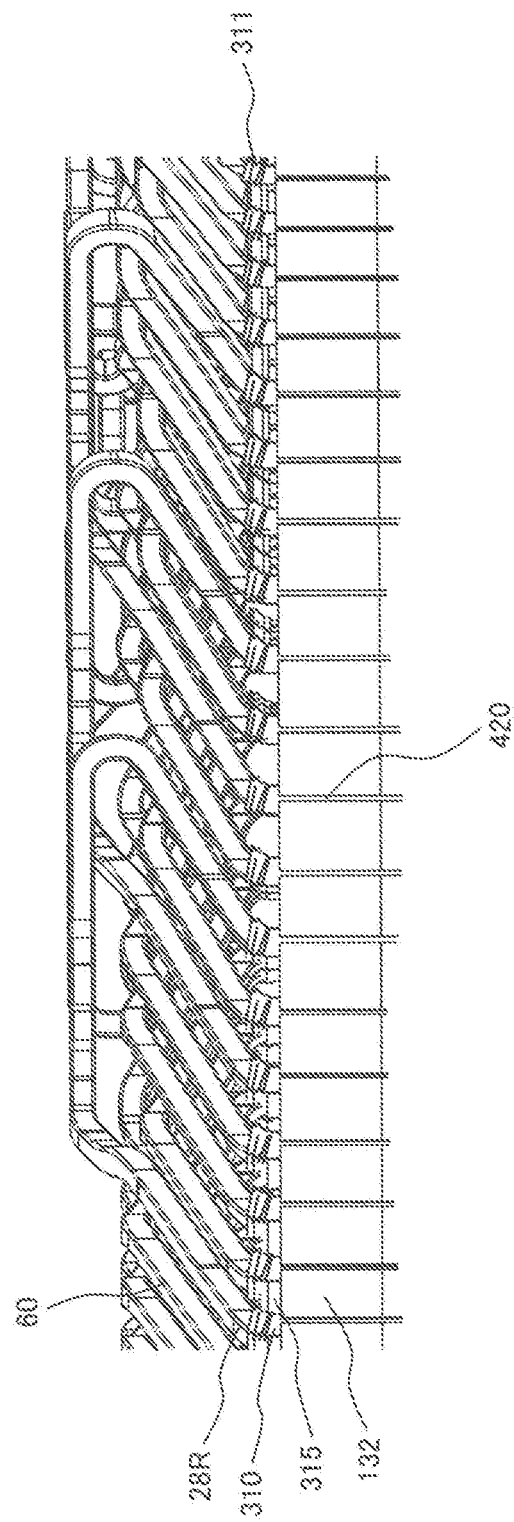
FIG. 16 illustrates the coil end section of the stator 20 provided with the slot liners 310 on each of which the bellows portion 311 is provided.

FIG. 16 illustrates the coil end section of the stator 20 provided with the slot liners 310 on each of which the above-mentioned bellows portion 311 is provided.

Because the creepage distance of the stator coil can be enlarged by the bellows portions 311, the interval between the bended sections 28R of the stator coil 60 adjoining to the stator iron core 132 and the stator iron core can be reduced while securing the insulation property of the stator. This permits the height of the coil end to be reduced without deteriorating the insulation property of the stator. Further, by making the end portions of the slot liners 310 take such bellows-like shape, it can avoid stress applied from the bended sections 28R from being concentrated on the end portions of the slot liners 310, so that it prevents the end portions of the slot liners 310 from being torn. Accordingly, the reliability of the electrical insulation on the part of the slot liners 310 improves.

Further, as mentioned above, the amount by which the stator coil 60 is pushed into the slots at the time of forming the bellows portions is controlled by the coil stopper jigs, so that the linear portions 315 are left over at the protruding sections of the slot liners 310 between the bellows portions 311 and the openings of the slots 420. Thus, it facilitates the presence of damage on the slot liners 310 to be checked, so that the efficiency with which such damage is checked improves. Further, by providing the protruding sections of the slot liners 310 with the linear portions 315, it allows the height of the protruding sections of the slot liners 310 to be substantially constant, so that the reliability of the electrical insulation on the part of the slot liners 310 improves.

Then, a rotating electrical machine modified from the above embodiment is exemplified as follows. To note, mainly, distinct points from the above embodiment are explained.

Figure 17:
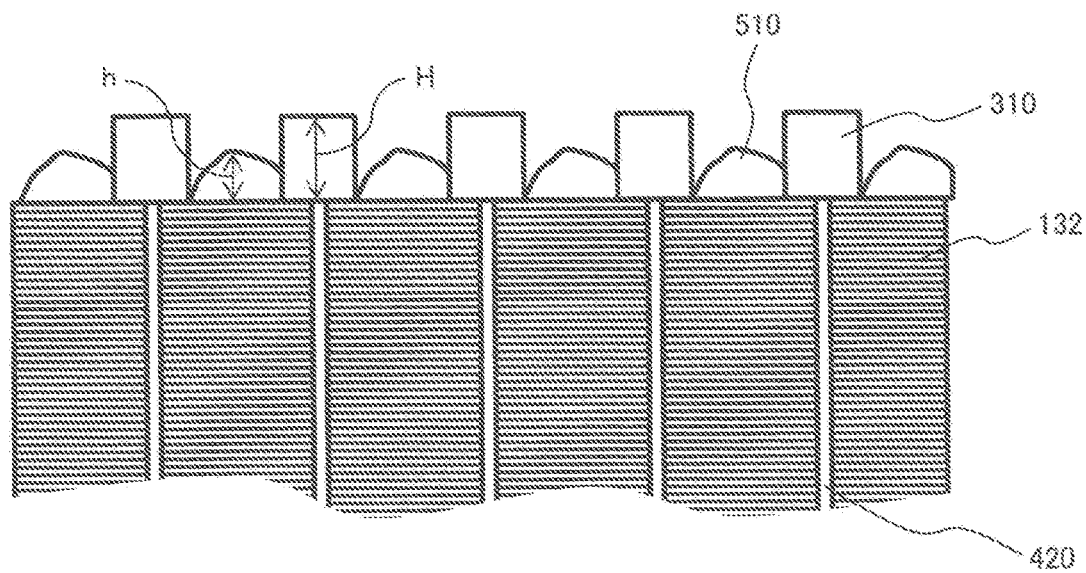
FIG. 17 illustrates the state of the stator iron core 132 after the slot liners are inserted into the slots.

FIG. 17, in relation to the present modified example, illustrates the state of the stator iron core 132 (corresponding to the state illustrated in FIG. 12 as mentioned above) after the slot liners 310 are inserted into the slots 420 and before the segment conductors 28 are inserted into the slots 420.

As illustrated in FIG. 17, in the present modified example as well or in the same way as the above embodiment (see FIG. 12), the coil stopper jigs 510 are mounted between the sections of the adjoining slot liners 310 protruding from the slots 420. To note, there are shape-related distinct features in the coil stopper jig 510 according to the present modified example from the above embodiment, which distinct features are described at a later stage.

Figure 18:
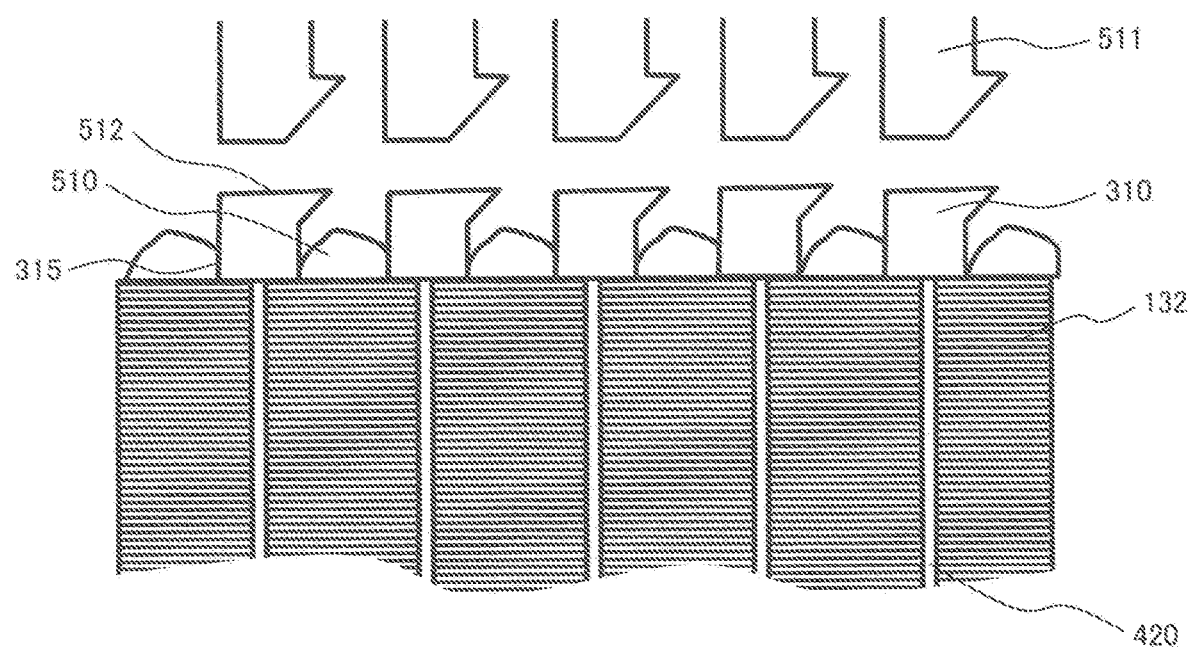
FIG. 18 illustrates the state of the stator iron core 132 when the slot liner widening jigs 511 are inserted into the slot liners 310.

FIG. 18 illustrates the state of the stator iron core 132 when the slot liner widening jigs 511 are inserted into the slot liners 310 illustrated in FIG. 17.

As illustrated in FIG. 18, by the slot liner widening jigs 511 being pushed into the protruding sections of the slot liners 310 by the prescribed amount, the circumferential widths of the tip end portions 512 of the protruding sections of the slot liners 310 are circumferentially widened such that the circumferential widths of such tip end portions are larger than the circumferential widths of the linear portions 315 of the slot liners 310. This facilitates the bellows portions 311 to be formed as described at a later stage.

In this regard, in order to secure the prescribed amount by which the tip end portions 512 of the protruding sections of the slot liners 310 are widened and to control the amount by which the slot liner widening jigs 511 are pushed into the protruding sections, the surface configuration of the coil stopper jig 510 side in which the tip end portion 512 of the protruding section of the slot liner 310 is widened is defined according to the configuration of the slot liner widening jig 511 where appropriate.

To note, the slot liner widening jigs 511 may be pushed into the slot liners 310 with an automated machine.

Figure 19:
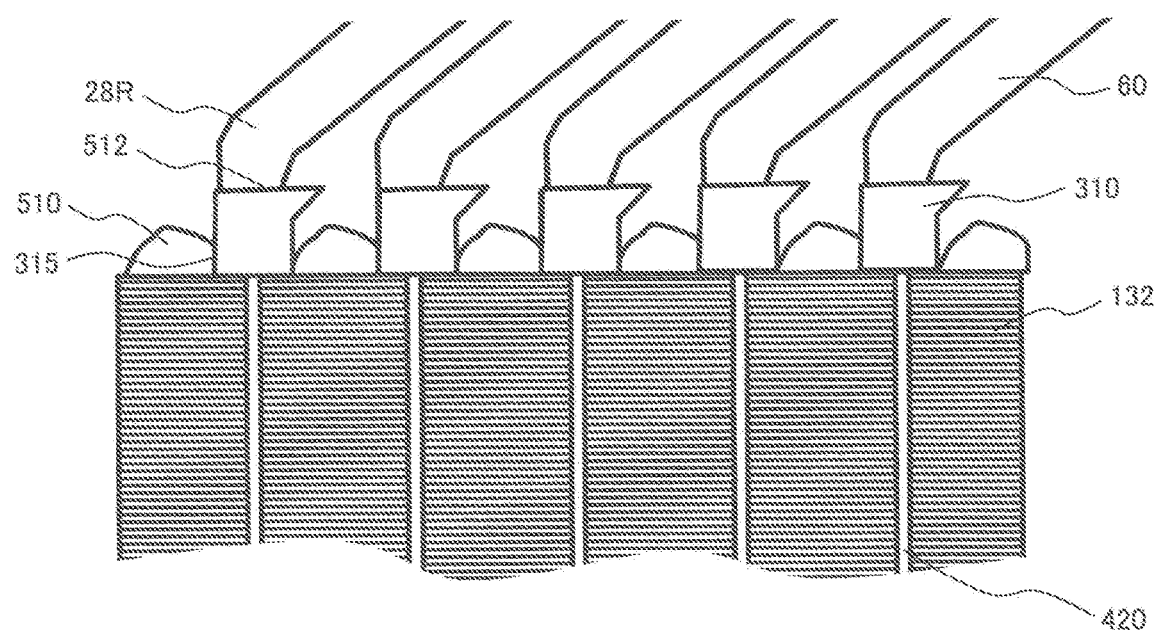
FIG. 19 illustrates the state of the stator iron core 132 immediately after the stator coil 60 is inserted into the slot liners 310 whose tip end portions are widened.

FIG. 19 illustrates the state of the stator iron core 132 immediately after the stator coil 60 is inserted into the slot liners 310 whose tip end portions are widened.

As illustrated in FIG. 19, each segment conductor is inserted into each slot 420 and into each slot liner 310 in the same way as the above embodiment (see FIG. 13).

In the state illustrated in FIG. 19, by the whole stator coil 60 being pressed from the upper side of the illustration or along the axial direction in the same way as the above embodiment (see FIG. 13), the respective segment conductors are pushed into the slots 420.

In the present modified example as well, the amount by which the stator coil 60 is pushed into the slots is controlled by the height of the coil stopper jigs 510.

Figure 20:
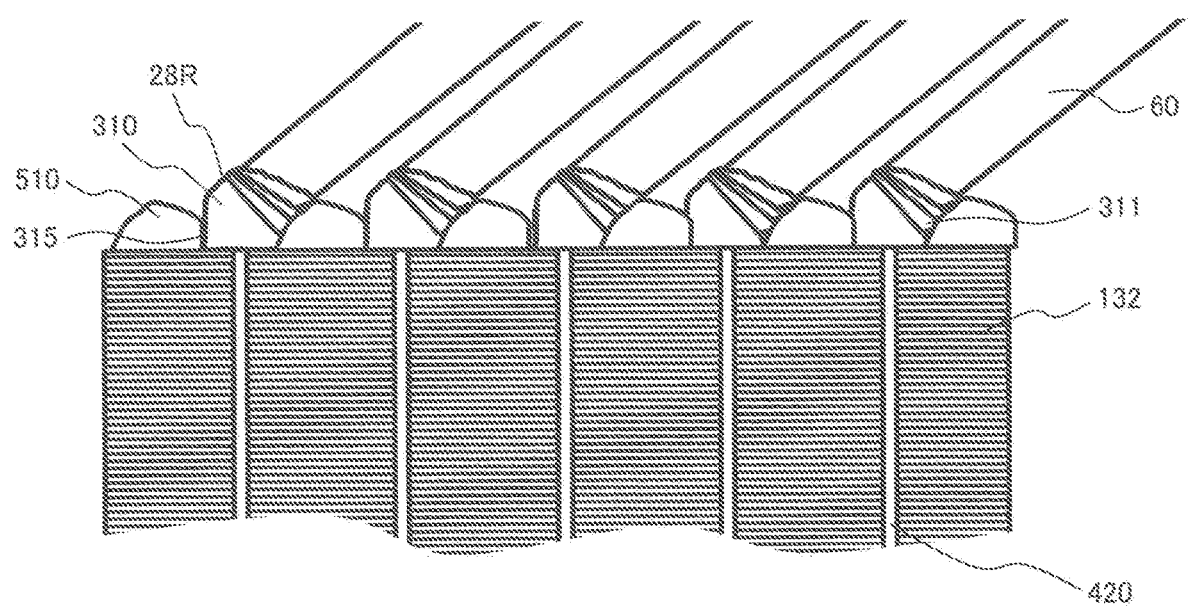
FIG. 20 illustrates the state of the stator iron core 132 after the stator coil 60 is pushed into the slots.

FIG. 20 illustrates the state of the stator iron core 132 after the stator coil 60 is pushed into the slots.

Upon the stator coil 60 being pushed into the slots, the widened portions of the tip end portions 512 of the protruding sections of the slot liners 310 are compressed by the bended sections 28R of the segment conductors. This ensures the bellows portions 311 as desired to be formed on the protruding sections of the slot liners 310 as illustrated in FIG. 20.

Figure 21:
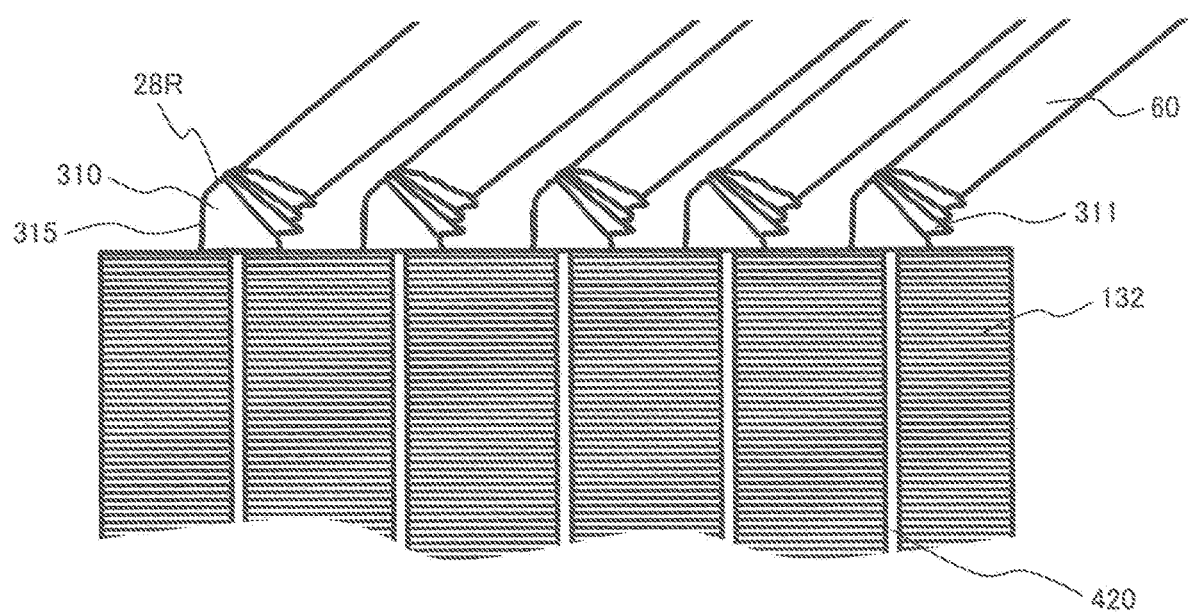
FIG. 21 illustrates the state of the stator iron core 132 when the coil stopper jigs are removed.

FIG. 21 illustrates the state of the stator iron core 132 after the stator coil 60 is pushed into the slot completes and when the coil stopper jigs are removed.

With the presence of the bellows portions 311, the Protruding sections of the slot liners 310 are hard to be torn, so that the electrical insulation distance between the segment conductors and the stator iron core can be secured with higher reliability in the same way as the above embodiment (see FIG. 15). Further, upon performing varnish treatment on the stator in such state as mentioned above, an insulating varnish permeates through the entries of the bellows portions 311 so that the insulation property of the stator improves in the same way as the above embodiment (see FIG. 15).

The above-described embodiment and modified example permit the insulation property of the stator to be secured while reducing the dimension of the coil end sections with respect to the axial direction or reducing the coil ends height. This allows a rotating electrical machine to be reduced in size without deteriorating its dielectric strength.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A stator for a rotating electrical machine comprising:
   a stator coil;
   a stator iron core having slots into which the stator coil is mounted; and
   insulating slot liners inserted into the slots, wherein
      conductive wire materials constituting the stator coil are inserted into the slot liners,
      sections of the slot liners protruding from the slots are each provided with a bellows portion, and
      the bellows portion comprises a plurality of folds that are immediately adjacent to one another and that are located between the stator coil and the slot liners.

2. The stator for a rotating electrical machine according to claim 1, wherein the protruding sections of the slot liners are each provided with a linear portion between the bellows portion and the stator iron core.

3. The stator for a rotating electrical machine according to claim 1, wherein the slot liners each include insulating paper.

4. The stator for a rotating electrical machine according to claim 1,
   wherein the conductive wire materials are each provided with a bended section adjoining to the stator iron core at a coil end section of the stator coil; and
   the bended sections abut onto the bellows portions of the slot liners.

5. The stator for a rotating electrical machine according to claim 1, wherein the stator coil is wound around the stator iron core by distributed winding.

6. The stator for a rotating electrical machine according to claim 1, wherein the protruding section is located at each end of the slot liner.

7. The stator for a rotating electrical machine according to claim 1, wherein the conductive wire materials each include a flat wire covered with insulating coat.

8. A rotating electrical machine comprising:
   a stator; and
   a rotor opposed to the stator, wherein
      the stator includes a stator coil, a stator iron core having slots into which the stator coil is mounted and insulating slot liners inserted into the slots,
      conductive wire materials constituting the stator coil are inserted into the slot liners,
      sections of the slot liners protruding from the slots are each provided with a bellows portion, and
      the bellows portion comprises a plurality of folds that are immediately adjacent to one another and that are located between the stator coil and the slot liners.

9. The rotating electrical machine according to claim 8, wherein the stator is cooled by a liquid refrigerant.

10. A method of producing a stator for a rotating electrical machine comprising the steps of:
    inserting insulating slot liners into slots of a stator iron core;
    inserting conductive wire materials constituting a stator coil and each provided with a bended section into the slot liners inserted into the slots; and
    pressing sections of the slot liners protruding from the slots by the bended sections of the conductive wire materials so as to form a bellows portion on each of the protruding sections, wherein the bellows portion comprises a plurality of folds that are immediately adjacent to one another and that are located between the stator coil and the slot liners.

11. The method according to claim 10, wherein a coil stopper jig is disposed between the protruding sections of the slot liners adjoining to each other before the conductive wire materials are inserted into the slot liners.

12. The method according to claim 10, wherein tip end portions of the protruding sections of the slot liners adjoining to each other are widened before the conductive wire materials are inserted into the slot liners.

* * * * *